Patented Sept. 30, 1930

1,777,159

UNITED STATES PATENT OFFICE

ARTHUR BIDDLE, OF TRENTON, NEW JERSEY, ASSIGNOR TO UNITED PRODUCTS CORPORATION OF AMERICA, A CORPORATION OF DELAWARE

ALBUMINOUS WATER-RESISTING ADHESIVE AND METHOD OF MAKING SAME

No Drawing.      Application filed July 21, 1927.   Serial No. 207,580.

This invention relates to combinations of normally inaqueous colloids, blood albumen and a water-soluble silicate.

By inaqueous and water-resisting colloids are meant such colloids as rubber, pure, crude, reclaimed or vulcanized, in their natural or artificial aqueous dispersion and especially rubber latex in its pure or treated, concentrated or preserved condition. Among the inaqueous colloids may also be mentioned the flexible gummy substances such as balata, gutta-percha, chicle, resins, natural or synthetic, cellulose solutions, tars, pitches, asphalts, etc.

Although the water-soluble silicate most commonly used is sodium silicate in dry or liquid form other silicates soluble in water may also be used such as potassium silicate, sodium or magnesium fluosilicate. Some water-soluble silicates such as the double silicates are not generally classed as colloidal substances, but become so on the addition thereto of a chemical like an alkali, which possibly changes the silicate to a hydroxide compound. The addition of an alkali like ammonia, sodium carbonate or sodium hydroxide also tends to stabilize the silicate, the aqueous dispersion as a unit or ingredients thereof. Although some silicates are alkaline not all of them are and whether they are alkaline or not, it sometimes occurs that there is insufficient alkali in the alkaline silicate to make them sufficiently stable. The alkali in some instances also acts upon the blood albumen and tends to stabilize the various other ingredients such as fillers, oils or vulcanizing ingredients that may be added to the composition.

The pure blood is sometimes used but due to the decomposable substances contained therein and other objectionable features the pure or treated blood albumen obtained therefrom is usually used. If the blood be treated with a modifying agent like sodium oxalate, sodium citrate or oxalic acid the fibrin contained in the blood will not separate from the blood but will give added adhesiveness to the albumen produced from the blood. It is of importance that the blood albumen be water-resisting when a water-resisting adhesive is desired. To accomplish this and to give greater water-resistance than the inaqueous colloid will give to the composition, a coagulating or insolubilizing agent may be added to the albumen alone or in combination with the water-soluble silicate or the inaqueous colloid. This insolubilizing agent does away, to some extent, with the necessity of heating the finished article to coagulate and thereby make the albumen water-resisting.

In practising my invention I may take, for instance, 100 parts by weight of blood albumen and let it dissolve in 160 parts by weight of water at room temperature. It may take from ten minutes to an hour or more to produce a homogeneous solution. The water-soluble silicate, preferably in solution, is then slowly added to the albumen solution, and the mixture added to 100 parts by weight of rubber latex, preferably preserved with ammonia. This makes an adhesive well suited to be used in the wood working industry. If desired, one or two parts by weight of paraformaldehyde, calcium chloride, or formaldehyde may be added to the composition to insolubilize the albumen. If this is not done and a vulcanized product is desired, about 5 parts by weight of sulphur and 5 parts by weight of zinc oxide may be added and the finished article heated to vulcanizing temperatures. Such heat will also coagulate the albumen in the composition.

Another embodiment of my invention, which although not being a strong adhesive may be advantageously adapted in the sizing, coating or plastic arts, is herewith given;

|  | Parts by weight |
|---|---|
| Blood albumen | 50 |
| Water (to dissolve the albumen) | 100 |
| Cassava starch | 10 |
| Water (to dissolve the starch) | 80 |
| Silicate of soda (approximately 40% solution) | 100 |

The starch is preferably dissolved with the aid of heat. The albumen, starch and silicate may be added together but this is not necessary as they may be combined in various orders. The above composition may then be combined with:

| | Parts by weight |
|---|---|
| Asphalt (natural or artificial) | 100 |
| Rubber (preferably pure) | 10 |

The asphalt and rubber may be aqueously dispersed by first dissolving in an organic solvent or by masticating aqueous dispersion agents, therewith, or as is preferable, the natural aqueous dispersion of rubber may be used and the asphalt be melted or dissolved in a solvent. If heavy oils like linseed, China wood, cottonseed, viscous petroleum, or coal tar or wood tar oils are to be used in the compositions, the more or less solid inaqueous colloids may be dissolved or dispersed in the more or less fluid oily substances.

In the examples given only the basic adhesive compositions are given but it is to be understood that filling materials zinc oxide, carbonate or stearates or the stearates of other compounds, such as calcium, barium or magnesium, carbon blacks, sulphur and sulphur compounds, asbestos, cotton, cellulose and many other fibrous materials like wood flour, ground or shredded cork and leather may be advantageously used especially when the adhesive needs a filler or is to be used as a base for plastic and moldable compositions or articles.

Further, preserving agents may be added to the composition to stop or prevent decomposition or to make the composition have a sweet odor. Such agents may be essential oils, like terpeneol, cedar oil or oil of bitter almonds. Other material like sodium formate, copper chloride, sodium benzoate, beta or alpha napthol, sodium salicylate are good preservative agents to be added in small amounts to the composition or decomposable ingredients thereof.

Although silicate of soda or other silicates and albumen are water-soluble or water-miscible colloids, other water-miscible or water-soluble colloidal substances may be added to the ingredients of my herein disclosed composition or to the components thereof. The addition of such materials is particularly beneficial when the composition is unstable, thin in fluidity or not sufficiently "tacky". Of these other water-soluble or water-miscible colloids may be mentioned: starches, modified or pure (preferably cassava), water-soluble oils like Turkey red oil, wool-grease, petroleum emulsifying oil, resin oils, soaps, gum arabic, tragacanth or karaya, saponin, Irish moss, animal or marine life glues and colloidal clays like bentonite, or the various caseins may be used.

It may be advisable to add insolubilizing agents to some of the above colloids or to the compositions containing them as nitrogenous and albuminous or carbo-hydrate materials are subject to decomposition and decay. The addition thereto of an insolubilizing agent tends to make such colloids water-resisting after the removal of the water from the aqueous dispersion. Among these agents might be mentioned zinc chloride, potassium chromate, tannic acid or other tannates. The addition of from one to five per cent of the insolubilizing agent is generally sufficient, but greater or less amounts (based on the dry weight of the material to be preserved) may be used. The insolubilizing agents that are used to insolubilize the albumen also as a general thing, tend to insolubilize the other water-soluble and insolubilizable colloids such as casein, starch, glue or gelatin. Colloidal clays being only water-absorptive, do not appear to come under the classification of insolubilizable colloids.

It is of course understood that when a colloid is referred to as "inaqueous" or "water-resisting" it is the substantially dry colloid or the solid content of the aqueous colloid that is referred to.

The word adhesive as herein used is meant in its broadest sense and may be of cohesive or adhesive nature, in dry or wet condition. It may mean a strong or weak glue, as a sizing or coating adhesive, as a wood glue or to be used as the base to make plastic materials or objects, that is, to adhere, glue, hold, fix, bind or occlude countless small articles of relatively water-soluble matter or fibrous material.

While I have herein described some particular compositions embodying my invention and methods of producing the same and also mentioned some of the arts in which my invention may be utilized, it is to be understood that the invention is not limited to those arts, or to the precise methods, ingredients or proportions mentioned.

Having thus described my invention, I claim and desire to protect by Letters Patent of the United States:

1. An adhesive composition comprising a normally water-resisting flexible elastic gum colloid, blood albumen and a water-soluble silicate.

2. An adhesive composition comprising a normally water-resisting flexible elastic gum colloid, blood albumen and sodium silicate in aqueous dispersion.

3. An adhesive composition in aqueous dispersion comprising rubber, blood albumen and sodium silicate.

4. An adhesive composition in aqueous dispersion comprising rubber latex, blood albumen and a water-soluble silicate.

5. An adhesive composition in aqueous dispersion comprising rubber latex, blood albumen and sodium silicate.

6. An adhesive composition comprising a normally water-resisting elastic gum colloid, blood albumen, a water-soluble silicate and an alkali.

7. An adhesive composition in aqueous dispersion comprising rubber latex, blood albumen, sodium silicate and an alkali.

8. An adhesive composition in aqueous dispersion comprising rubber, blood albumen, and a water-soluble silicate.

9. An adhesive composition in aqueous dispersion comprising rubber, blood albumen, a water-soluble silicate and an alkaline stabilizing medium.

10. An adhesive composition in aqueous dispersion comprising rubber latex, blood albumen, ammonia, and a water-soluble compound of silica.

In witness whereof I have set my hand this 19th day of July, 1927.

ARTHUR BIDDLE.